(12) United States Patent
Kim

(10) Patent No.: US 7,042,520 B2
(45) Date of Patent: May 9, 2006

(54) METHOD FOR COLOR SATURATION ADJUSTMENT WITH SATURATION LIMITATION

(75) Inventor: Yeong-Taeg Kim, Irvine, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 544 days.

(21) Appl. No.: 10/226,601

(22) Filed: Aug. 23, 2002

(65) Prior Publication Data
US 2004/0041951 A1  Mar. 4, 2004

(51) Int. Cl.
*H04N 9/68* (2006.01)
(52) U.S. Cl. .................. 348/645; 348/647; 348/648
(58) Field of Classification Search .............. 348/703, 348/645, 646, 647, 648; H04N 9/68
See application file for complete search history.

(56) References Cited

U.S. PATENT DOCUMENTS

| | | | | |
|---|---|---|---|---|
| 4,633,299 A | * | 12/1986 | Tanaka | 348/656 |
| 4,812,902 A | | 3/1989 | Fuchsberger | |
| 4,953,008 A | | 8/1990 | Kaye | |
| 4,953,011 A | | 8/1990 | Mori et al. | |
| 6,177,962 B1 | * | 1/2001 | Rumreich et al. | 348/648 |

FOREIGN PATENT DOCUMENTS

| | | |
|---|---|---|
| EP | 1 017 241 A2 | 7/2000 |
| EP | 1 326 425 A2 | 7/2003 |

OTHER PUBLICATIONS

Collins English dictionary, 1994, p. 1377, 3$^{rd}$ ed, Harper-Collins Publishers, Great Britain.

* cited by examiner

*Primary Examiner*—Michael H. Lee
(74) *Attorney, Agent, or Firm*—Michael Zarrabian, Esq.; Myers, Dawes, Andras & Sherman, LLP; Jeffrey P. Aiello

(57) ABSTRACT

A method for adjusting and limiting a color saturation level S of a color pixel of an input image includes steps of: obtaining a first chrominance value U and a second chrominance value V representing the color pixel of the input image; determining the color saturation level S in dependence on the first chrominance value U and the second chrominance value V; determining a saturation limiting parameter β in dependence on the color saturation level S; obtaining an adjusted first chrominance value by multiplying the first chrominance value U by the saturation limiting parameter β; obtaining an adjusted second chrominance value by multiplying the second chrominance value by the saturation limiting parameter β; and representing a color pixel of an output image with the adjusted first and second chrominance values. The process is repeated for each pixel of each image of the input video signal.

39 Claims, 10 Drawing Sheets

METHOD FOR COLOR SATURATION ADJUSTMENT WITH SATURATION LIMITATION

BACKGROUND OF THE INVENTION

Field of the Invention

The present invention is a method of adjusting the color saturation level of a video signal without saturating the colors. The method includes computing the color saturation level of each color pixel of the input image and properly limiting an increase in the color saturation level even though the color saturation level gain is high. Hence, the present invention provides a way of adjusting the color saturation level of a video signal without introducing artifacts due to color saturation.

The luminance and chromatic component Y, U, V color system, also known as the luminance and color difference color system Y, R-Y, B-Y, is the color system that is most widely used in video systems. For example, in a digital TV system, the Y, U, and V signals of a video are compressed and transmitted. In such a system, since the color information is embedded in the chroma signals U and V, the color saturation level is simply adjusted by multiplying the chroma signals U and V by a color saturation adjusting gain α as expressed in the following equations:

$$U_t = \alpha \cdot U \quad (1)$$

and $$V_t = \alpha \cdot V \quad (2)$$

$U_t$ and $V_t$ are now color adjusted chroma signals. FIG. 1 is a block diagram of a prior art color saturation adjusting circuit 10 that can be used to multiply the sample values of the chroma signals U and V by the saturation adjusting gain α. Note that if the saturation adjusting gain α=0, the resulting sample value will have no color. If the saturation adjusting gain α>1, then the color of the resulting sample value will be enriched.

One drawback of the color saturation adjusting method that is performed by the color saturation adjusting circuit 10 shown in FIG. 1 is that a color can be saturated. That is, depending on the degree of the color saturation level of the input sample and the requested value of the color saturation adjusting gain α, the value of the output chroma samples $U_t$ and $V_t$ can be saturated, which generates some visual artifacts.

SUMMARY OF THE INVENTION

It is accordingly an object of the invention to provide a method for adjusting the color saturation level in a YUV color system in which the method has a saturation limiting function.

For each color pixel of an input image, the color saturation level of the pixel is calculated using a predetermined relationship, and the amount that the saturation level of the pixel can be increased is limited depending upon the calculated saturation level. In this manner, the color of the pixel being adjusted will not be saturated.

With the foregoing and other objects in view there is provided, in accordance with the invention, a method for adjusting and limiting a color saturation level S of a color pixel of an input image. The method includes steps of: obtaining a first chrominance value U and a second chrominance value V representing the color pixel of the input image; determining the color saturation level S in dependence on the first chrominance value U and the second chrominance value V; determining a saturation limiting parameter in dependence on the color saturation level S; obtaining an adjusted first chrominance value by multiplying the first chrominance value U by the saturation limiting parameter; obtaining an adjusted second chrominance value by multiplying the second chrominance value V by the saturation limiting parameter; and representing a color pixel of an output image with the adjusted first chrominance value and the adjusted second chrominance value.

In accordance with a first embodiment of the invention, the method includes: performing the step of obtaining the adjusted first chrominance value by also multiplying the first chrominance value U by a saturation adjusting gain α; performing the step of obtaining the adjusted second chrominance value by also multiplying the second chrominance value V by the saturation adjusting gain α; determining the color saturation level S in dependence on a first factor $U_t$ equaling the saturation adjusting gain α times the first chrominance value U and in dependence on a second factor $V_t$ equaling the saturation adjusting gain α times the second chrominance value V; setting a limiting saturation level L that will be used to limit the color saturation level of the color pixel; and performing the steps of obtaining the adjusted first chrominance value and obtaining the adjusted second chrominance value by: when the color saturation level S is greater than the limiting saturation level L, then setting the saturation limiting parameter equal to the limiting saturation level L divided by the color saturation level S.

In accordance with an added feature of the first embodiment of the invention, the method includes: when performing the steps of obtaining the adjusted first chrominance value and obtaining the adjusted second chrominance value, and when the color saturation level S is not greater than the limiting saturation level L, then setting the saturation limiting parameter equal to one.

In accordance with a second embodiment of the invention, the method includes: performing the step of obtaining the adjusted first chrominance value by also multiplying the first chrominance value U by a saturation adjusting gain α; performing the step of obtaining the adjusted second chrominance value by also multiplying the second chrominance value V by the saturation adjusting gain α; setting a limiting saturation level L that will be used to limit the color saturation level of the color pixel; and performing the steps of obtaining the adjusted first chrominance value and obtaining the adjusted second chrominance value by: when the color saturation level S is greater than the limiting saturation level L divided by the saturation adjusting gain α, then setting the saturation limiting parameter equal to L/(α)(S).

In accordance with an added feature of the second embodiment of the invention, the method includes: performing the steps of obtaining the adjusted first chrominance value and obtaining the adjusted second chrominance value by: when the color saturation level S is not greater than the limiting saturation level L, then setting the saturation limiting parameter equal to one.

In accordance with a third embodiment of the invention, the method includes: setting a saturation adjusting gain α; setting a limiting saturation level L that will be used to limit the color saturation level of the color pixel; and performing the steps of obtaining the adjusted first chrominance value and obtaining the adjusted second chrominance value by:

when the color saturation level S is greater than the limiting saturation level L divided by the saturation adjusting gain α, then setting the saturation limiting parameter equal to L/S; and when the color saturation level S is not greater than the limiting saturation level L divided by the saturation adjusting gain α, then setting the saturation limiting parameter equal to the saturation adjusting gain α.

In the third embodiment of the invention, note that the value of the saturation limiting parameter is set to perform a double function. In this case, the saturation limiting parameter can act as a saturation adjusting gain parameter and as a saturation limiting parameter. For example, when the color saturation level S is not greater than the limiting saturation level L divided by the saturation adjusting gain α, then the saturation limiting parameter takes on the value of and acts as the saturation adjusting gain α. When the color saturation level S is greater than the limiting saturation level L divided by the saturation adjusting gain α, then the value of the saturation limiting parameter is set to a limiting value of L/S.

With the foregoing and other objects in view there is provided, in accordance with the invention, a fourth embodiment of the method for adjusting and limiting a color saturation level S of a color pixel of an input image. The fourth embodiment of the method includes: obtaining a first chrominance value U and a second chrominance value V representing the color pixel of the input image; determining the color saturation level S in dependence on the first chrominance value U and the second chrominance value V; determining a real color adjusting gain parameter x in dependence on the color saturation level S; obtaining an adjusted first chrominance value by multiplying the first chrominance value by the real color adjusting gain parameter x; obtaining an adjusted second chrominance value by multiplying the second chrominance value by the real color adjusting gain parameter x; and representing a color pixel of an output image with the adjusted first chrominance value and the adjusted second chrominance value.

In accordance with an added feature of the fourth embodiment of the invention, the method includes: setting a limiting saturation level L that will be used to limit the color saturation level of the color pixel; obtaining a color saturation adjusting gain α; performing the steps of obtaining the adjusted first chrominance value and obtaining the adjusted second chrominance value by:

when the color saturation adjusting gain α is not greater than one, then setting the real color adjusting gain parameter x to be equal to the color saturation adjusting gain α;

when the color saturation adjusting gain α is greater than one, then setting the real color adjusting gain parameter x to be equal to an equation f(S) that is a function of the color saturation level S; and selecting the equation f(S) to be a monotonically decreasing function over a range from zero to the limiting saturation level L, selecting the equation f(S) to equal the color saturation adjusting gain α when the color saturation level S equals zero, and selecting the equation f(S) to equal 1 when the color saturation level S is greater than the limiting saturation level L.

In accordance with an added feature of the fourth embodiment of the invention, the method includes: selecting the equation f(S) to be $1+(\alpha-1)(L-S)(L+S)/L^2$.

In accordance with an additional feature of the fourth embodiment of the invention, the method includes: setting a limiting saturation level L that will be used to limit the color saturation level of the color pixel; obtaining a color saturation adjusting gain α; performing the steps of obtaining the adjusted first chrominance value and obtaining the adjusted second chrominance value by:

when the color saturation adjusting gain α is not greater than one, then setting the real color adjusting gain parameter x to be equal to the color saturation adjusting gain α; and when the color saturation adjusting gain α is greater than one and the color saturation level S is greater than the limiting saturation level L, then setting the real color adjusting gain parameter x to be equal to one.

In accordance with a fifth embodiment of the invention, the method includes: setting a limiting saturation level L that will be used to limit the color saturation level of the color pixel; obtaining a color saturation adjusting gain α; performing the steps of obtaining the adjusted first chrominance value and obtaining the adjusted second chrominance value by:

when the color saturation adjusting gain α is not greater than one, then setting the real color adjusting gain parameter x to be equal to the color saturation adjusting gain α;

when the color saturation adjusting gain α is greater than one and the color saturation level S is greater than the limiting saturation level L, then setting the real color adjusting gain parameter x to be equal to one;

selecting an equation f(S) that varies as a function of the color saturation level S, selecting the equation f(S) to be a monotonically decreasing function over a range from zero to the limiting saturation level L, selecting the equation f(S) to equal the color saturation adjusting gain α when the color saturation level S equals zero, and selecting the equation f(S) to equal 1 when the color saturation level S is greater than the limiting saturation level L; and when the color saturation adjusting gain α is greater than one and the color saturation level S is not greater than the limiting saturation level L, then setting the real color adjusting gain parameter x to be equal to a minimum value selected from the group consisting of the equation f(S) evaluated at the color saturation level S and a value obtained by dividing the limiting saturation level L by the color saturation level S.

All embodiments of the invention can be generically defined by a method including steps of: obtaining a first chrominance value U and a second chrominance value V representing the color pixel of the input image; determining the color saturation level S in dependence on the first chrominance value U and the second chrominance value V; determining a parameter Z in dependence on the color saturation level S; obtaining an adjusted first chrominance value by multiplying the first chrominance value by the parameter; obtaining an adjusted second chrominance value by multiplying the second chrominance value by the parameter; and representing a color pixel of an output image with the adjusted first chrominance value and the adjusted second chrominance value. It should be understood that the parameter Z can be either the saturation limiting parameter β (first and second embodiments), a parameter r having both a saturation limiting function and a saturation adjusting gain function (third embodiment), or the real color adjusting gain x (fourth and fifth embodiments).

In accordance with an added feature of the invention, the method includes: obtaining a luminance value representing the color pixel of the input image; and representing the color pixel of the output image with the luminance value.

DESCRIPTION OF THE PREFERRED EMBODIMENTS

Figure 1:
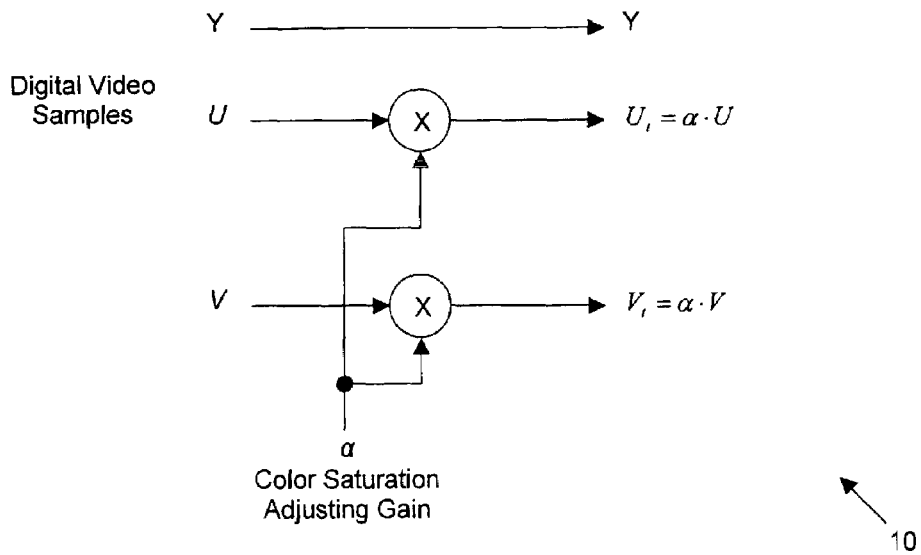
FIG. 1 is a block diagram of a prior art color saturation adjusting circuit.

Let us denote Y, U, and V as the sample values of the input luminance and chroma signals. Let us also denote Y, $U_t$ and $V_t$ as the sample values of luminance and chroma signals that are output by the color saturation adjusting circuit 10 shown in FIG. 1, after the color saturation adjusting method described in equations (1) and (2) has been performed. The fundamental object of the present invention is to multiply the sample values of the chroma signals $U_t$ and $V_t$ by a saturation limiting parameter β for the purpose of limiting the saturation level to a certain level. FIG. 2 is a block diagram of a first embodiment of an inventive color saturation adjusting circuit 20 provided for that purpose. The sample values of the chroma signals $U_o$ and $V_o$ that are output by the color saturation adjusting circuit 20 are described by the following equations:

$$U_o = \beta \cdot U_t \quad (3)$$

and $$V_o = \beta \cdot V_t \quad (4).$$

Now the problem is how to formulate a suitable value for the saturation limiting parameter β. Note that the purpose of multiplying the sample values of the chroma signals $U_t$ and $V_t$ by the saturation limiting parameter β as described in equations (3) and (4) is to prevent the saturation of ($U_t$, $V_t$) when the saturation level of ($U_t$, $V_t$) exceeds a certain level.

In the following discussion, we will speak of an "input sample" Y, U and $V_t$ where it should be understood that the term "input sample" means the sample value of the luminance signal, the sample value of the chroma signal U, and the sample value of the chroma signal V representing one pixel of an input color image. To systematically derive the saturation limiting parameter β, it is necessary to define a saturation level of a given input color sample Y, U and V. Let us denote $S_t$ as the saturation level of the input color sample Y, U and V.

One way of computing the saturation level $S_t$ of the input sample Y, U and V is by using the following equation:

$$S_t = \sqrt{U^2 + V^2} \quad (5).$$

Figure 2:
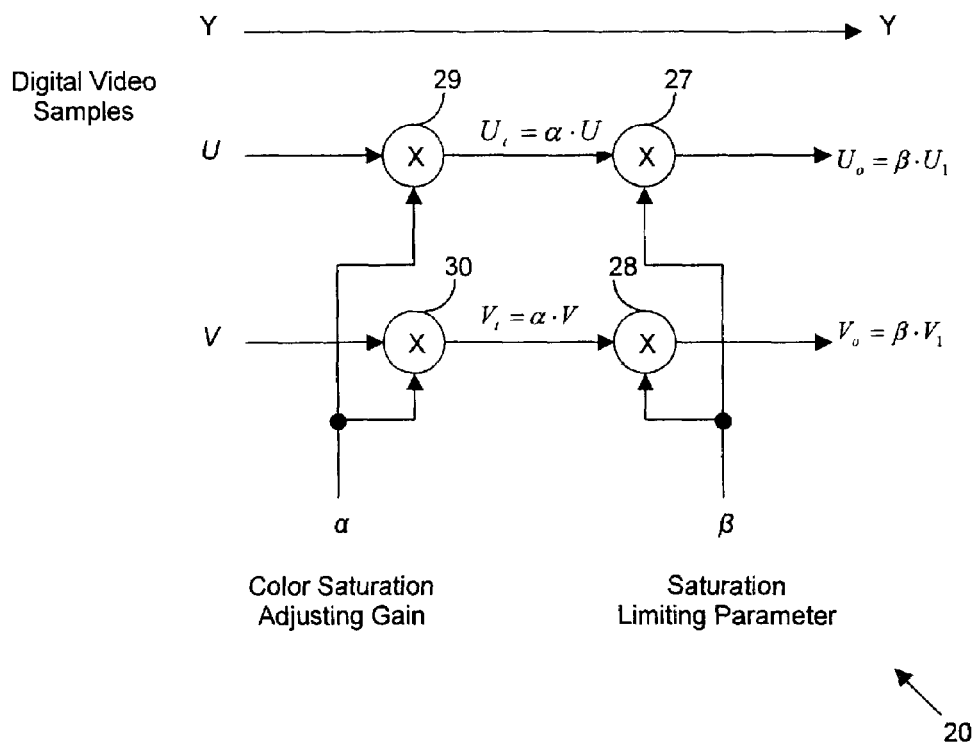
FIG. 2 is a block diagram of a first embodiment of an inventive color saturation adjusting circuit.

Similarly, let us denote $S_t$ as the saturation level of the color sample Y, $U_t$ and $V_t$ that is output by a typical color adjusting circuit, for example, the color adjusting circuit 10 that is shown in FIG. 1. The saturation level $S_t$ of the output color sample Y, $U_t$ and $V_t$ can then similarly be computed by using the following equation:

$$S_t = \sqrt{U_t^2 + V_t^2} \quad (6).$$

Remember that α is the color saturation adjusting gain of the color adjusting circuit 10. This color adjusting circuit 10 has been incorporated into the color adjusting circuit 20 shown in FIG. 2 using multipliers 29 and 30. The multipliers 29 and 30 provide $U_t$ and $V_t$ by performing the multiplications expressed by equations (1) and (2), and thereby adjust the saturation of the input sample Y, U, and V by the color saturation adjusting gain α. It is obvious by considering the purpose of introducing the saturation limiting parameter β, that β=1 if the saturation level $S_t$ is less than a certain level indicating a "not saturated" condition. Hence, it can be stated that:

$$\beta = 1 \text{ if } S_t \leq L, \quad (7)$$

where L denotes a predetermined saturation level to which we want to limit the color saturation level of the output adjusted color samples. Hence, it can also be stated that:

$$U_o = U_t \text{ and } V_o = V_t, \quad (8)$$

when $S_t \leq L$.

In the case when $S_t > L$, we need to multiply $U_t$ and $V_t$ by β so that the color saturation level of Y, U, and V, can be adjusted as a factor of β in order to prevent possible saturation. So, let us denote $S_o$ as the color saturation level of the color sample Y, $U_o$ and $V_o$ that is output by the color saturation adjusting circuit 20. The color saturation level $S_o$ can be expressed by the following equation:

$$S_o = \beta \cdot S_t.$$

If we use the constraint that $S_o = L$, then we obtain:

$$\beta = \frac{L}{S_t}. \quad (9)$$

If we combine equation (9) with equations (3) and (4), we obtain:

$$U_o = \frac{L}{S_t} \cdot U_t \text{ and } V_o = \frac{L}{S_t} \cdot V_t \quad (10)$$

when $S_t > L$.

A first embodiment of a method for adjusting and limiting the color saturation level of an input sample Y, U, and V is described by utilizing the following equations:

$$U_o = \beta \cdot U_t \text{ and } V_o = \beta \cdot V_t \quad (11)$$

where $$\beta = \begin{cases} 1 & \text{if } S_t \leq L \\ \dfrac{L}{S_t} & \text{else} \end{cases} \quad (12)$$

and $U_t = \alpha \cdot U$ and $V_t = \alpha \cdot V$ (equations (1) and (2)) are obtained by multiplying the chroma components of the input sample by the saturation adjusting gain α. FIG. 2 shows that multipliers 29 and 30 are used to multiply the chroma components of the input sample by the saturation adjusting gain α, and multipliers 27 and 28 are used to multiply the results by the saturation limiting parameter β.

Figure 3:
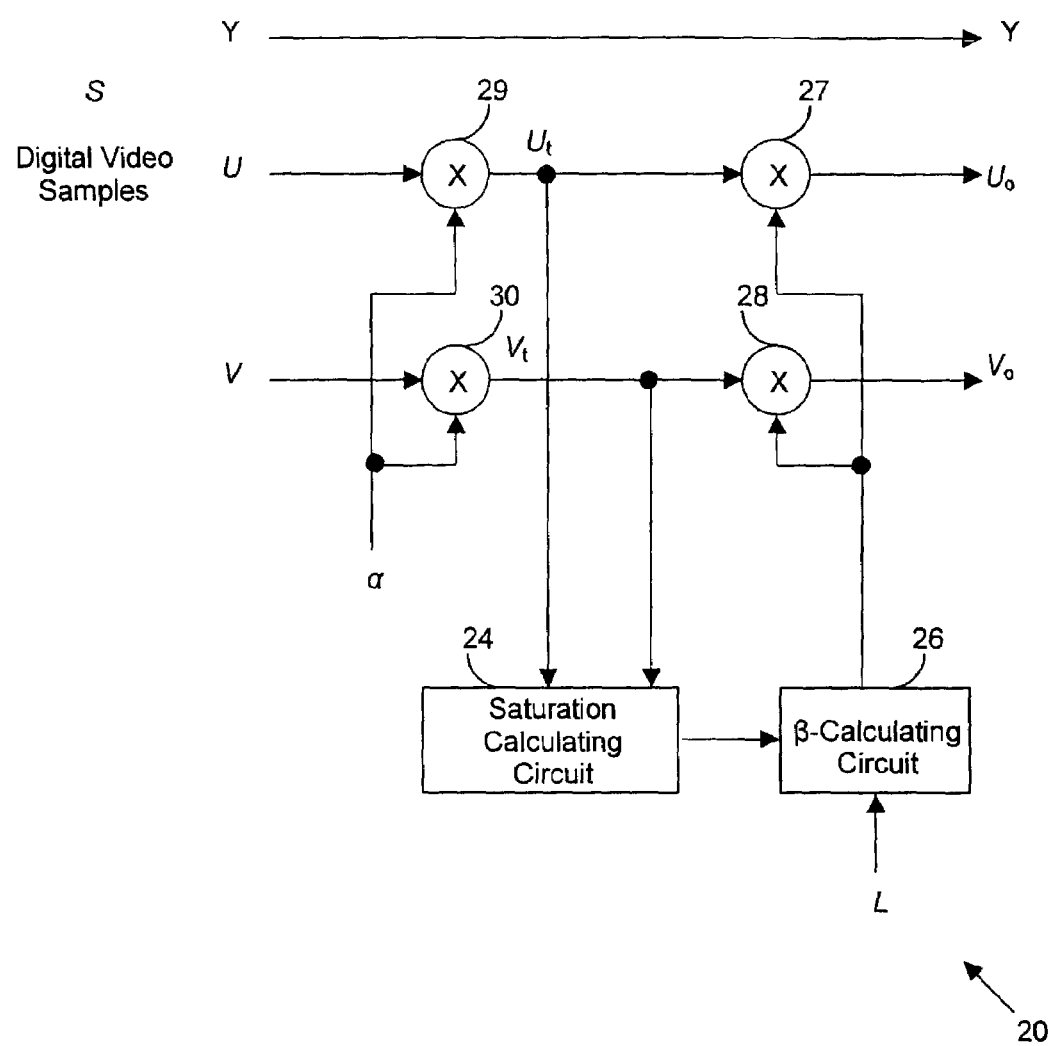
FIG. 3 is a more detailed block diagram of the first embodiment of the color saturation adjusting circuit.

FIG. 3 shows a more detailed block diagram of the color saturation adjusting circuit 20 shown in FIG. 2. A saturation calculating circuit 24 is provided for estimating or defining the saturation level $S_t$ of the input sample Y, U and V, after the chroma components of the input sample Y, U and V have been acted upon by the saturation adjusting gain α. The saturation calculating circuit 24 can use equation (6) to calculate the saturation level $S_t$. It should be understood that other equations could be used to define the saturation level $S_t$ and that the method is not restricted to using any specific equation for doing so. Some examples of other equations that can be used for defining the saturation level $S_t$ are as follows:

$$S_t = \alpha \cdot (U_t^2 + V_t^2),$$

$$S_t = \alpha \cdot (|U_t| + |V_t|),$$

$$S_t = \alpha \cdot (U_t^2, V_t^2),$$

$$S_t = \alpha \cdot \max(|U_t|, |V_t|), \text{ and}$$

$$S_t = \alpha \cdot (U_t^2 + V_t^2 + (U_t - V_t)^2).$$

A β-calculating circuit 26 is provided for calculating the value of the saturation limiting parameter β in accordance with equation (12). Once the value of the saturation limiting parameter β is calculated, the chroma components $U_o$ and $V_o$ of the output sample can be obtained by the multipliers 27 and 28, which operate in accordance with equations (11) and (12).

A second embodiment of the method for adjusting and limiting the color saturation level of an input sample Y, U, and V can be developed by first utilizing the equations given in (1) and (2). Using the equations (1) and (2), it can be shown that:

$$S_t = \sqrt{U_t^2 + V_t^2} = \alpha \cdot \sqrt{U^2 + V^2} = \alpha \cdot S_r \qquad (13)$$

If we use this relation along with the equations given in (11) and (12), the second embodiment of the method for adjusting and limiting the color saturation level of an input sample Y, U, and V can be described by the following equations:

$$U_o = \beta \cdot \alpha \cdot U \text{ and } V_o = \beta \cdot \alpha \cdot V \qquad (14)$$

where $$\beta = \begin{cases} 1 & \text{if } S_t \leq \dfrac{L}{\alpha} \\ \dfrac{L}{\alpha \cdot S_t} & \text{else.} \end{cases} \qquad (15)$$

Figure 4:
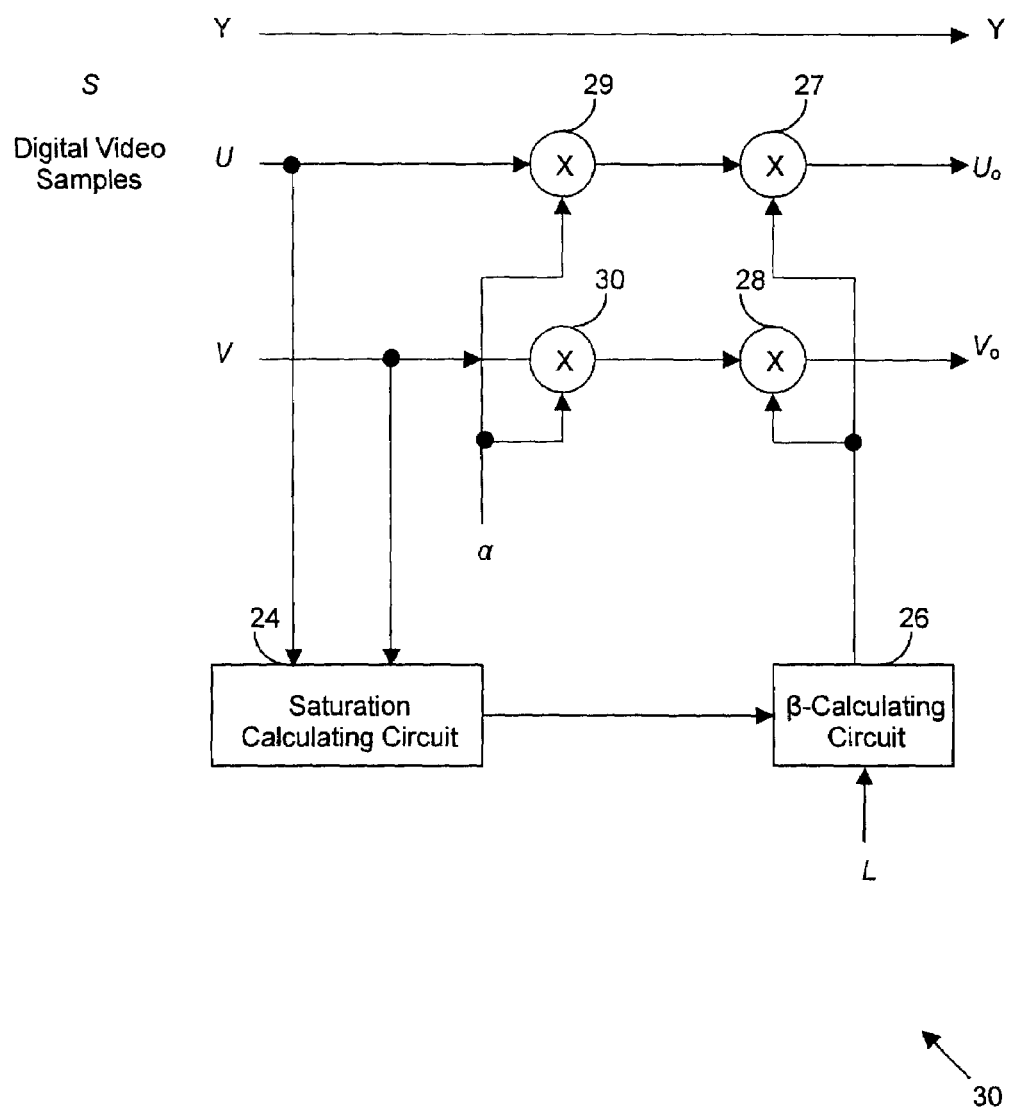
FIG. 4 is a block diagram of a second embodiment of the color saturation adjusting circuit.

FIG. 4 shows a second embodiment of the color saturation adjusting circuit 30, which can be used for performing the second embodiment of the method for adjusting and limiting the color saturation level of an input sample Y, U, and V. The functional elements are the same as those described in FIG. 3 and therefore, the same reference numerals have been used. The difference is that in the second embodiment of the color saturation adjusting circuit 30, the saturation calculating circuit 24 calculates the saturation of the input sample Y, U, and V before the chroma components U and V of the input sample have been multiplied by the saturation adjusting gain a. The saturation calculating circuit 24 can define the saturation by using any suitable equation. For example, equation (5) or any one of the following equations are suitable:

$$S_t = \alpha \cdot (U^2 + V^2),$$

$$S_t = \alpha \cdot (|U| + |V|),$$

$$S_t = \alpha \cdot \max(U^2, V^2),$$

$$S_t = \alpha \cdot \max(|U|, |V|), \text{ or}$$

$$S_t = \alpha \cdot (U^2 + V^2 + (U - V)^2)$$

A third embodiment of the method for adjusting and limiting the color saturation level of an input sample Y, U, and V can be developed by factoring the saturation adjusting gain α out of equations (14) and (15). In doing so, we obtain:

$$U_o = r \cdot U \text{ and } V_o = r \cdot V \qquad (16)$$

where $$r = \begin{cases} \alpha & \text{if } S_t \leq \dfrac{L}{\alpha} \\ \dfrac{L}{S_t} & \text{else.} \end{cases} \qquad (17)$$

Note that the method described by (16) and (17) is equivalent to the method described by (11) and (12), but note that the method described by (16) and (17) requires less computation. In this case, "r" acts not only as a saturation limiting parameter, but also as a saturation adjusting gain parameter. It should be apparent that r=αβ, where β is given by equation (15).

Figure 5:
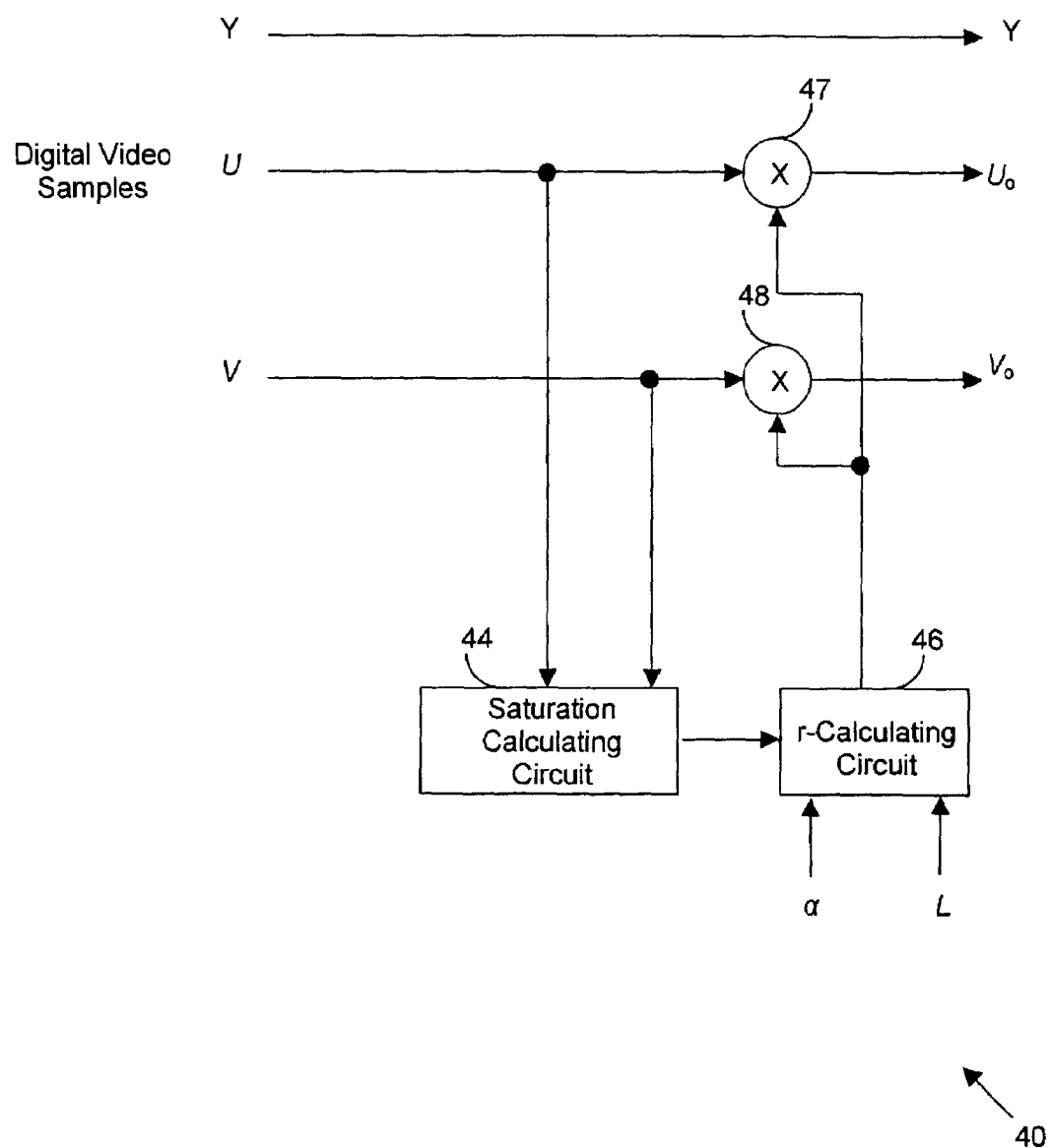
FIG. 5 is a block diagram of a third embodiment of the color saturation adjusting circuit.

FIG. 5 shows a third embodiment of the color saturation adjusting circuit 40, which can be used to perform the third embodiment of the method for adjusting and limiting the color saturation level of an input sample Y, U, and V. The saturation calculating circuit 44 calculates the saturation of the input sample Y, U, and V in a manner similar to that explained with regard to the second embodiment. The r-calculating circuit 46 calculates the value of r from the input saturation adjusting gain α and the predetermined limiting saturation level L. It can be seen that the third embodiment provides an advantage over the first two embodiments because only two multipliers 47 and 48 are required.

A fourth embodiment of the method for adjusting and limiting the color saturation level of an input sample Y, U, and V will now be developed. Given α as the color saturation adjusting gain, let us denote $U_o$ and $V_o$ as the chroma components of the output sample, which are given by:

$$U_o = x \cdot U \text{ and } V_o = x \cdot V \qquad (18a).$$

The real color adjusting gain x is defined as:

$$x = \begin{cases} \alpha & \text{if } 0 \leq \alpha \leq 1 \\ f(S_t) & \text{if } \alpha > 1, \end{cases} \qquad (18b)$$

in which $f(S_t)$ must satisfy the following conditions:
1) $f(S_t)$ is a monotonically decreasing function over the range $0 \leq S_t \leq L$ where L is a pre-determined constant;
2) $f(0) = \alpha$; and
3) $f(S_t) = 1$ for $S_t \geq L$.

Figure 7:
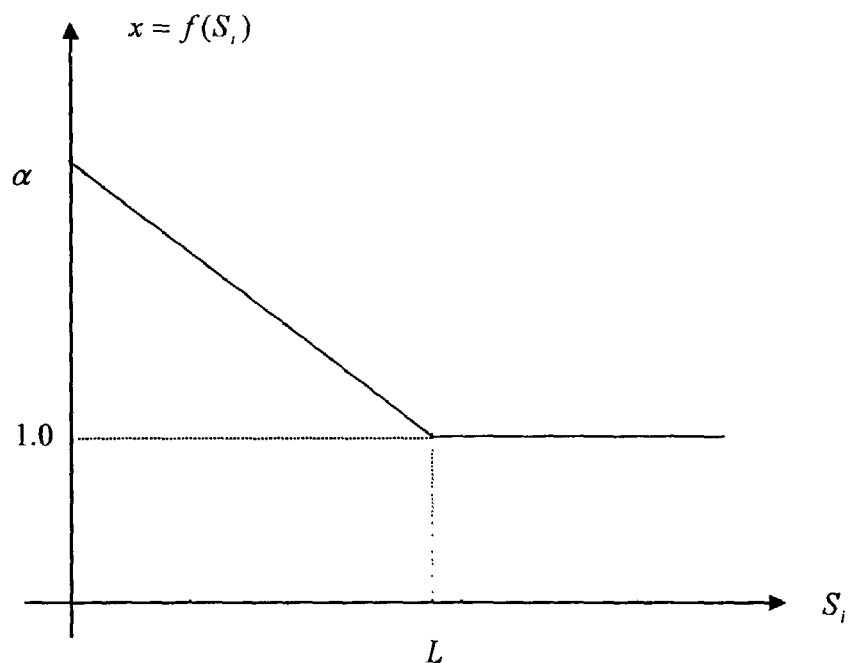
FIGS. 6–8 show examples of functions that can be used for the real color adjusting gain.
Figure 6:
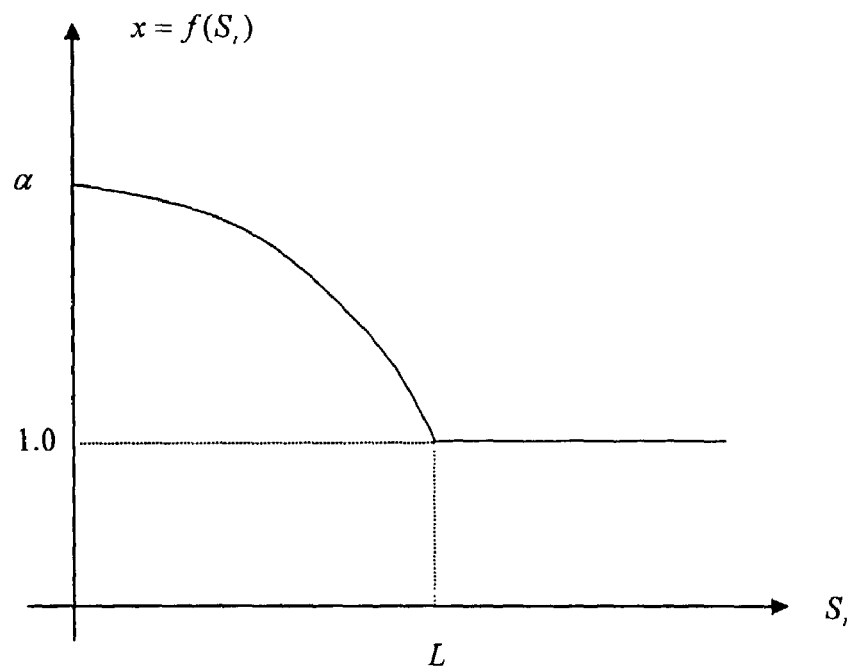
Figure 8:
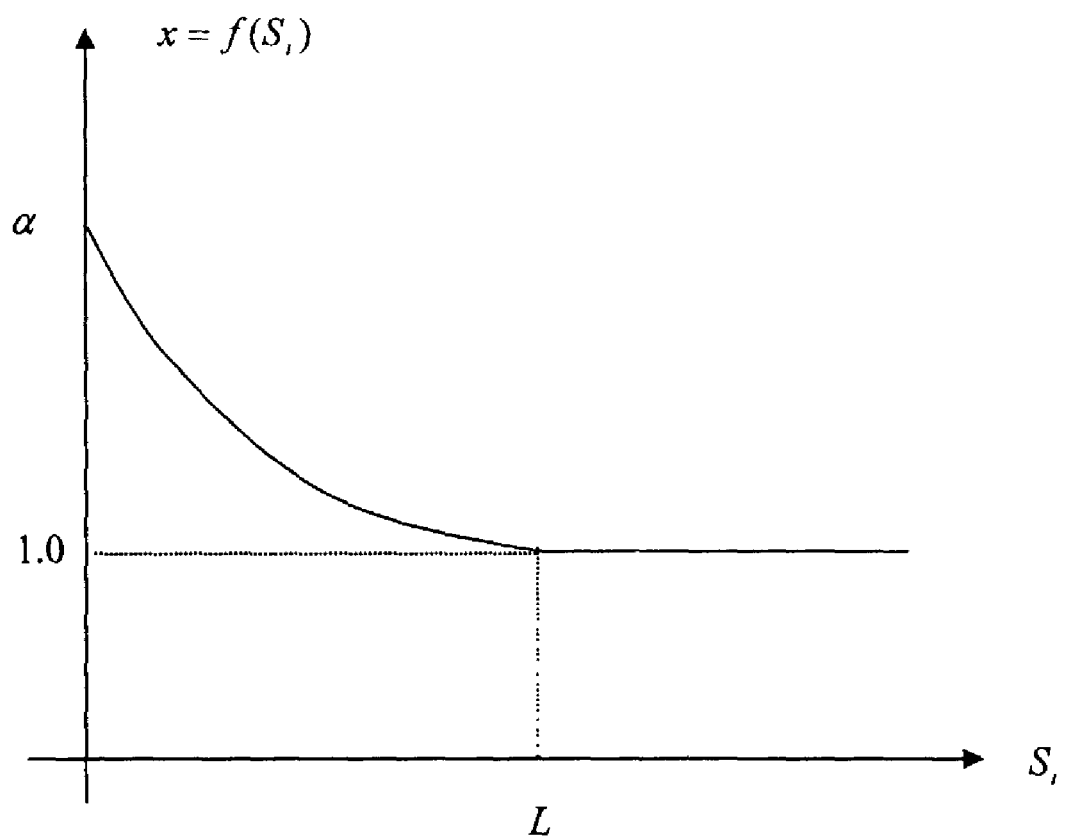

Examples of functions that can be used for x are shown in FIGS. 6, 7, and 8. For instance, $x=f(S_i)$ for $0 \leq S_i \leq L$ in FIG. 6 can be expressed as:

$$x = 1 + (\alpha - 1) \cdot \frac{(L - S_i) \cdot (L + S_i)}{L^2}$$

Note that the real color adjusting gain becomes:

$$x = \begin{cases} \alpha & \text{if } 0 \leq \alpha \leq 1 \\ 1 & \text{if } \alpha > 1 \end{cases}$$

when $S_i > L$ by the constraints on $f(S_i)$.

Figure 9:
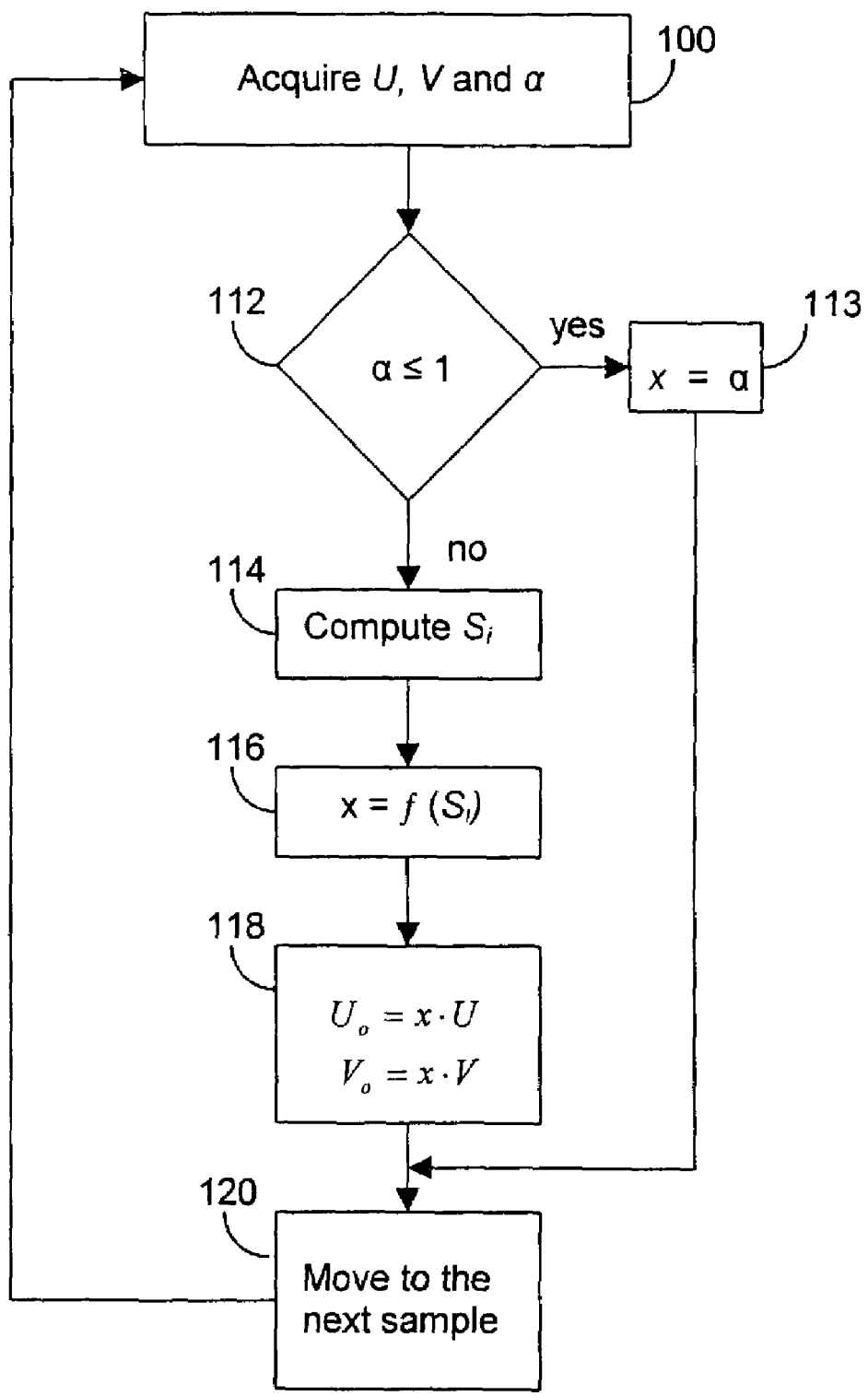
FIG. 9 is a flowchart of a fourth embodiment of a method for adjusting and limiting color saturation.

FIG. 9 is a flow chart showing the fourth embodiment of the method, which is based on equations (18a) and (18b), for adjusting and limiting the color saturation level of an input color sample Y, U, and V. In step 100, the chroma components U and V of the input color sample Y, U, and V are obtained, and the value of the saturation adjusting gain α is acquired, for example, from a circuit that sets this parameter. In step 112, it is determined whether the value of the saturation adjusting gain α is less than or equal to one. If so, then the real color adjusting gain x is set to equal the value of the saturation adjusting gain α in step 113. If not, then the saturation level $S_1$ is calculated in step 114, which can be performed using any of the previously presented formulas. It should be recognized that other formulas could be used to calculate the saturation level $S_1$ and the method is not restricted to any specific formula. In step 116, the real color adjusting gain x is calculated as a function of the calculated saturation level $S_1$ of the input sample using the equation $f(S_i)$. In step 118, the chroma components $U_O$ and $V_O$ of the corresponding output sample are calculated using the real color adjusting gain x. In step 120, the next color sample of the input image is obtained and then the whole process is repeated for each sample value of each image of the input video signal.

Figure 10:
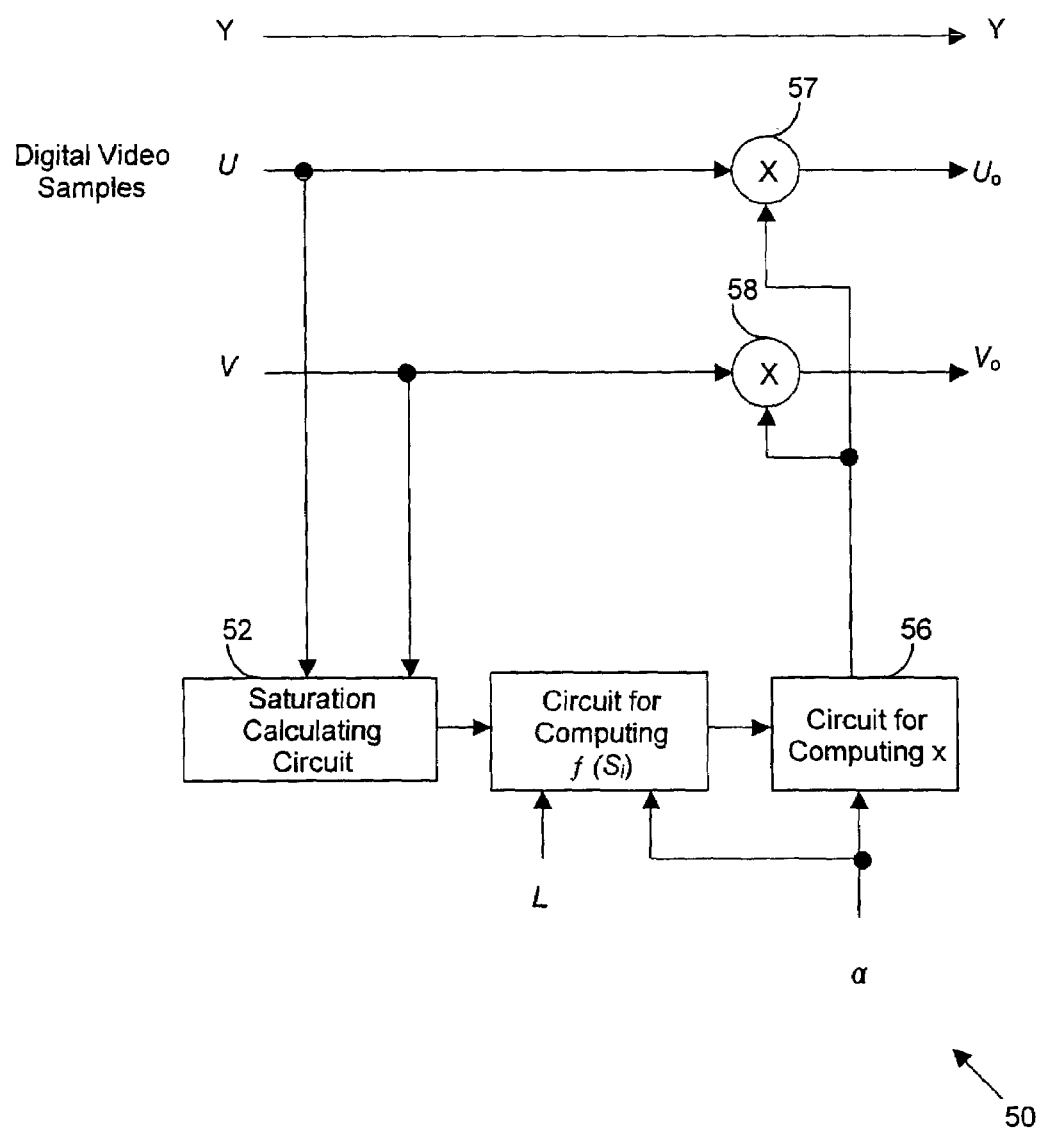
FIG. 10 is a block diagram of a fourth embodiment of the color saturation adjusting circuit.

FIG. 10 is a block diagram of a fourth embodiment of the color saturation adjusting circuit 50 for performing the fourth embodiment of the method. The saturation calculating circuit 52 calculates the saturation level $S_1$ of the input sample as previously described. The circuit 54 for computing $f(S_i)$ computes the value of $f(S_i)$ in dependence on the value of the saturation level $S_1$. The circuit 56 for computing x, computes the real color adjusting gain x as a function of the calculated saturation level $S_1$ of the input sample. Finally, multipliers 57 and 58 multiply the chroma components U and V of the input sample by the real color adjusting gain x to obtain the chroma components $U_O$ and $V_O$ of the output sample Y, $U_O$ and $V_O$. The color saturation adjusting circuit 50 would then similarly act on the next color sample of the input image.

A fifth embodiment of the method for adjusting and limiting the color saturation level of an input color sample Y, U, and V can be developed by imposing an additional constraint in equation (18b). We will limit the saturation level of the Y, $U_o$ and $V_o$ sample using the relation:

$$S_o = x \cdot S_i \leq L.$$

When $S_i \leq L$ and $\alpha > 1$, that relation provides the following condition:

$$x \leq \frac{L}{S_i}. \tag{19}$$

By combining (18b) and (19), we obtain:

$$x = \begin{cases} \alpha & \text{if } 0 \leq \alpha \leq 1 \\ \min(f(S_i), \frac{L}{S_i}) & \text{if } a > 1 \text{ and } S_i \leq L \\ 1 & \text{if } a > 1 \text{ and } S_i > L. \end{cases} \tag{20}$$

Figure 11:
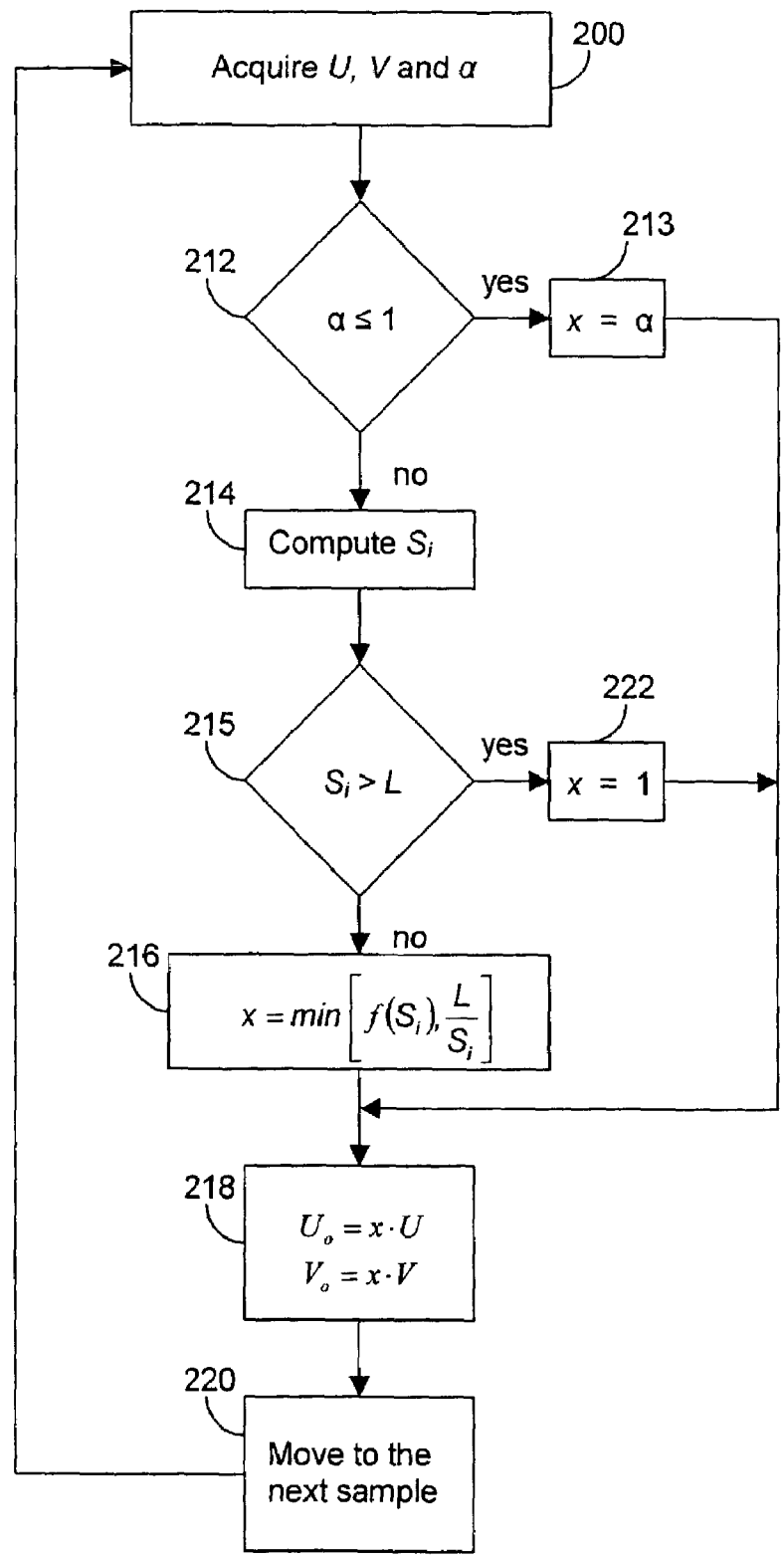
FIG. 11 is a flowchart of a fifth embodiment of a method for adjusting and limiting color saturation.

FIG. 11 is a flow chart showing the fifth embodiment of the method, which is based on equations (18a) and (20), for adjusting and limiting the color saturation level of an input color sample Y, U, and V. In step 200, the chroma components U and V of the input color sample Y, U, and V are obtained, and the value of the saturation adjusting gain α is acquired, for example, from a circuit that sets this parameter. In step 212, it is determined whether the value of the saturation adjusting gain α is less than or equal to one. If so, then the real color adjusting gain x is set to equal the value of the saturation adjusting gain α in step 213. If not, then the saturation level $S_i$ is calculated in step 214, which can be performed using any of the previously presented formulas. It should be recognized that other formulas could be used to calculate the saturation level $S_i$ and the method is not restricted to any specific formula. In step 215, it is determined whether the saturation level $S_i$ is greater than the predetermined constant L. If so, then the value of the real color adjusting gain x is set equal to one, and the method continues with step 218. If not, then in step 216, a first value is obtained by determining the value of equation $f(S_i)$ at the saturation level $S_i$ that has been calculated. A second value is obtained by dividing the value of the predetermined constant L by the saturation level $S_i$. Finally, in step 216, the value of the real color adjusting gain x is set to the minimum value selected from the first value and the second value. In step 218, the chroma components $U_O$ and $V_O$ of the corresponding output sample are calculated using the real color adjusting gain x. In step 220, the next color sample of the input image is obtained and then the whole process is repeated for each sample value of each image of the input video signal.

Figure 12:
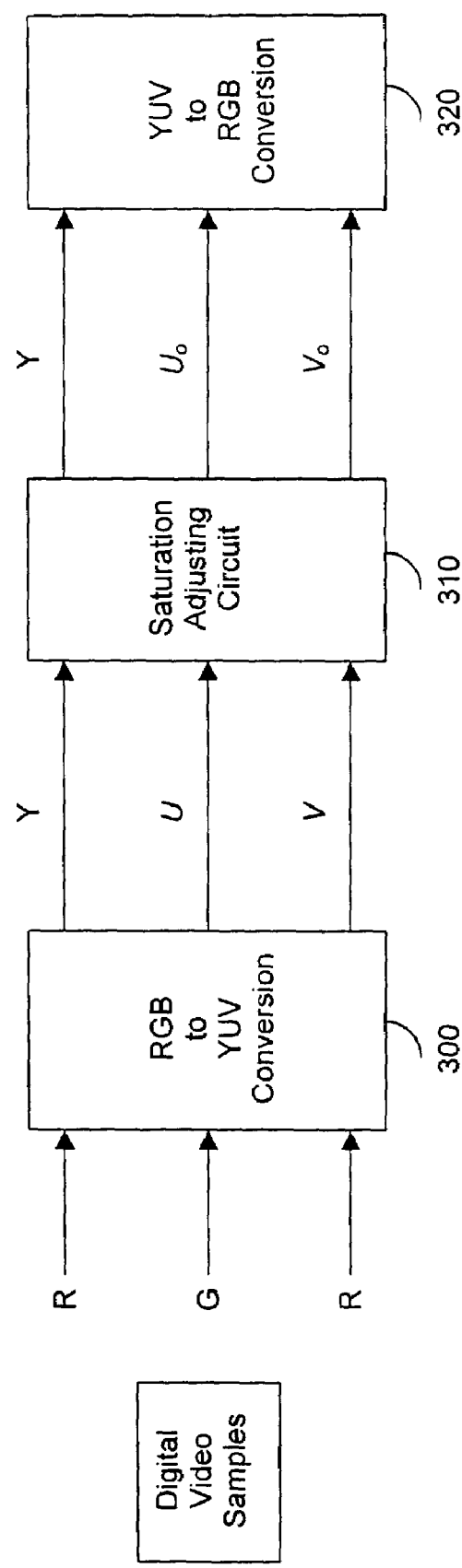
FIG. 12 is a block diagram showing how the method can be used with an RGB color system.

All of the embodiments of the method for adjusting and limiting the color saturation level have been described using the chroma components U and V of a luminance and chromatic component Y, U, and V system. FIG. 12 shows how the method can be used with a composite video system RGB. In step 300, the sample representing a RGB signal is converted to a sample representing a YUV signal. In step 310, one of the embodiments of the method for adjusting and limiting the color saturation level of an input color sample Y, U, and V is performed. Then in step 320, the YUV sample is converted back to an RGB sample for further processing or for display. Of course, the process is repeated for each sample value of each image of the input video signal.

I claim:

1. A method for adjusting and limiting a color saturation level S of a color pixel of an input image, which comprises:
   obtaining a first chrominance value U and a second chrominance value V representing the color pixel of the input image;
   determining the color saturation level S in dependence on the first chrominance value U and the second chrominance value V;
   determining a saturation limiting parameter in dependence on the color saturation level S;
   obtaining an adjusted first chrominance value by multiplying the first chrominance value U by the saturation limiting parameter;
   obtaining an adjusted second chrominance value by multiplying the second chrominance value V by the saturation limiting parameter; and
   representing a color pixel of an output image with the adjusted first chrominance value and the adjusted second chrominance value.

2. A method for adjusting and limiting a color saturation level S of a color pixel of an input image, which comprises:
   obtaining a first chrominance value U and a second chrominance value V representing the color pixel of the input image;
   determining a color saturation level S in dependence on a first factor $U_t$ equaling a saturation adjusting gain $\alpha$ times the first chrominance value U and in dependence on a second factor $V_t$ equaling the saturation adjusting gain $\alpha$ times the second chrominance value V;
   determining a saturation limiting parameter in dependence on the color saturation level S;
   obtaining an adjusted first chrominance value by multiplying the first chrominance value U by the saturation limiting parameter and by the saturation adjusting gain $\alpha$;
   obtaining an adjusted second chrominance value by multiplying the second chrominance value V by the saturation limiting parameter and by the saturation adjusting gain $\alpha$;
   setting a limiting saturation level L that will be used to limit the color saturation level of the color pixel, such that:
      when the color saturation level S is greater than the limiting saturation level L, then setting the saturation limiting parameter equal to the limiting saturation level L divided by the color saturation level S; and
   representing a color pixel of an output image with the adjusted first chrominance value and the adjusted second chrominance value.

3. The method according to claim 2, which comprises:
   performing the steps of obtaining the adjusted first chrominance value and obtaining the adjusted second chrominance value by:
      when the color saturation level S is not greater than the limiting saturation level L, then setting the saturation limiting parameter equal to one.

4. The method according to claim 2, which comprises determining the color saturation level S using formula:
$$S_t=(U_t^2+V_t^2)^{1/2}$$

5. The method according to claim 2, which comprises determining the color saturation level S using formula:
$$S_t=\alpha(U_t^2+V_t^2)$$

6. The method according to claim 2, which comprises determining the color saturation level S using formula:
$$S=\alpha(|U_t|+|V_t|)$$

7. The method according to claim 2, which comprises determining the color saturation level S using formula:
$$S=\alpha[\max(U_t^2, V_t^2)]$$

8. The method according to claim 2, which comprises determining the color saturation level S using formula:
$$S=\alpha[\max(|U_t|,|V_t|)]$$

9. The method according to claim 2, which comprises determining the color saturation level S using formula:
$$S=\alpha(U_t^2+V_t^2+(U_t-V_t)^2)$$

10. A method for adjusting and limiting a color saturation level S of a color pixel of an input image, which comprises:
    obtaining a first chrominance value U and a second chrominance value V representing the color pixel of the input image;
    determining the color saturation level S in dependence on the first chrominance value U and the second chrominance value V;
    obtaining an adjusted first chrominance value by multiplying the first chrominance value U by the saturation limiting parameter and by the saturation adjusting gain $\alpha$;
    obtaining an adjusted second chrominance value by multiplying the second chrominance value V by the saturation limiting parameter and by the saturation adjusting gain $\alpha$;
    setting a limiting saturation level L that will be used to limit the color saturation level of the color pixel, such that:
       when the color saturation level S is greater than the limiting saturation level L divided by the saturation adjusting gain $\alpha$, then setting the saturation limiting parameter equal to $L/(\alpha)$ (S); and
    representing a color pixel of an output image with the adjusted first chrominance value and the adjusted second chrominance value.

11. The method according to claim 10, which comprises:
    performing the steps of obtaining the adjusted first chrominance value and obtaining the adjusted second chrominance value by:
       when the color saturation level S is not greater than the limiting saturation level L, then setting the saturation limiting parameter equal to one.

12. The method according to claim 10, which comprises determining the color saturation level S using formula;
$$S=(U^2+V^2)^{1/2}$$

13. The method according to claim 10, which comprises determining the color saturation level S using formula;
$$S=\alpha(U^2+V^2).$$

14. The method according to claim 10, which comprises determining the color saturation level S using formula;
$$S=\alpha(|U|+|V|).$$

15. The method according to claim 10, which comprises determining the color saturation level S using formula;
$$S=\alpha[\max(U^2, V^2)].$$

16. The method according to claim 10, which comprises determining the color saturation level S using formula;
$$S=\alpha[\max(|U|,|V|)].$$

17. The method according to claim 10, which comprises determining the color saturation level S using formula;

$$S=\alpha(U^2+V^2+(U-V)^2).$$

18. A method for adjusting and limiting a color saturation level S of a color pixel of an input image, which comprises:
  obtaining a first chrominance value U and a second chrominance value V representing the color pixel of the input image;
  determining the color saturation level S in dependence on the first chrominance value U and the second chrominance value V;
  determining a saturation limiting parameter in dependence on the color saturation level S;
  setting a saturation adjusting gain $\alpha$;
  obtaining an adjusted first chrominance value by multiplying the first chrominance value U by the saturation limiting parameter and by the saturation adjusting gain $\alpha$;
  obtaining an adjusted second chrominance value by multiplying the second chrominance value V by the saturation limiting parameter and by the saturation adjusting gain $\alpha$;
  setting a limiting saturation level L that will be used to limit the color saturation level of the color pixel, such that:
    when the color saturation level S is greater than the limiting saturation level L divided by the saturation adjusting gain $\alpha$, then setting the saturation limiting parameter equal to L/S; and
    when the color saturation level S is not greater than the limiting saturation level L divided by the saturation adjusting gain $\alpha$, then setting the saturation limiting parameter equal to the saturation adjusting gain $\alpha$; and
  representing a color pixel of an output image with the adjusted first chrominance value and the adjusted second chrominance value.

19. The method according to claim 18, which comprises determining the color saturation level S using formula:

$$S=(U^2+V^2)^{1/2}.$$

20. The method according to claim 18, which comprises determining the color saturation level S using formula:

$$S=\alpha(U^2+V^2).$$

21. The method according to claim 18, which comprises determining the color saturation level S using formula:

$$S=\alpha(|U|+|V|).$$

22. The method according to claim 18, which comprises determining the color saturation level S using formula:

$$S=\alpha[\max(U^2,\ V^2)].$$

23. The method according to claim 18, which comprises determining the color saturation level S using formula:

$$S=\alpha[\max(|U|,|V|)].$$

24. The method according to claim 18, which comprises determining the color saturation level S using formula:

$$S=\alpha(U^2+V^2+(U-V)^2).$$

25. A method for adjusting and limiting a color saturation level S of a color pixel of an input image, which comprises:
  obtaining a first chrominance value U and a second chrominance value V representing the color pixel of the input image;
  determining the color saturation level S in dependence on the first chrominance value U and the second chrominance value V;
  determining a saturation limiting parameter in dependence on the color saturation level S;
  obtaining an adjusted first chrominance value by multiplying the first chrominance value U by the saturation limiting parameter;
  obtaining an adjusted second chrominance value by multiplying the second chrominance value V the saturation limiting parameter;
  obtaining a luminance value representing the color pixel of the input image; and
  representing a color pixel of an output image with the adjusted first chrominance value, the adjusted second chrominance value and the luminance value.

26. A method for adjusting and limiting a color saturation level S of a color pixel of an input image, which comprises:
  obtaining a first chrominance value U and a second chrominance value V representing the color pixel of the input image;
  determining the color saturation level S in dependence on the first chrominance value U and the second chrominance value V;
  determining a real color adjusting gain parameter x in dependence on the color saturation level S;
  obtaining an adjusted first chrominance value by multiplying the first chrominance value U by the real color adjusting gain parameter x;
  obtaining an adjusted second chrominance value by multiplying the second chrominance value V by the real color adjusting gain parameter x; and
  representing a color pixel of an output image with the adjusted first chrominance value and the adjusted second chrominance value.

27. The method according to claim 26, which comprises:
  obtaining a luminance value representing the color pixel of the input image; and
  providing the luminance value to represent the color pixel of the output image.

28. The method according to claim 26, which comprises:
  setting a limiting saturation level L that will be used to limit the color saturation level of the color pixel;
  obtaining a color saturation adjusting gain $\alpha$;
  performing the steps of obtaining the adjusted first chrominance value and obtaining the adjusted second chrominance by;
    when the color saturation adjusting gain $\alpha$ is not greater than one, then setting the real color adjusting gain parameter x to be equal to the color saturation adjusting gain $\alpha$;
    when the color saturation adjusting gain $\alpha$ is greater than one, then setting the real color adjusting gain parameter x to be equal to an equation f(S) that is a function of the color saturation level S; and
    selecting the equation f(S) to be a monotonically decreasing function over a range from zero to the limiting saturation level L, selecting the equation f(S) to equal the color saturation adjusting gain $\alpha$ when the color saturation level S equals zero, and selecting the equation f(S) to equal 1 when the color saturation level S is greater than the limiting saturation level L.

29. The method according to claim 28, which comprises: selecting the equation f(S) to be $1+(\alpha-1)(L-S)(L+S)/L^2$.

30. The method according to claim 26, which comprises:
setting a limiting saturation level L that will be used to limit the color saturation level of the color pixel;
obtaining a color saturation adjusting gain α;
performing the steps of obtaining the adjusted first chrominance value and obtaining the adjusted second chrominance value by:
   when the color saturation adjusting gain α is not greater than one, then setting the real color adjusting gain parameter x to be equal to the color saturation adjusting gain α;
   when the color saturation adjusting gain α is greater than one and the color saturation level S is greater than the limiting saturation level L, then setting the real color adjusting gain parameter x to be equal to one;
   selecting an equation f(S) that varies as a function of the color saturation level S, selecting the equation f(S) to be a monotonically decreasing function over a range from zero to the limiting saturation level L, selecting the equation f(S) to equal the color saturation adjusting gain α when the color saturation level S equals zero, and selecting the equation f(S) to equal 1 when the color saturation level S is greater than the limiting saturation level L; and
   when the color saturation adjusting gain α is greater than one and the color saturation level S is not greater than the limiting saturation level L, then setting the real color adjusting gain parameter x to be equal to a minimum value selected from the group consisting of the equations f(S) evaluated at the color saturation level S and a value obtained by dividing the limiting saturation level L by the color saturation level S.

31. The method according to claim 26, which comprises:
setting a limiting saturation level L that will be used to limit the color saturation level of the color pixel;
obtaining a color saturation adjusting gain α;
performing the steps of obtaining the adjusted first chrominance value and obtaining the adjusted second chrominance value by:
   when the color saturation adjusting gain α is not greater than one, then setting the real color adjusting gain parameter x to be equal to the color saturation adjusting gain α; and
   when the color saturation adjusting gain α is greater than one and the color saturation level S is greater than the limiting saturation level L, then setting the real color adjusting gain parameter x to be equal to one.

32. The method according to claim 26, which comprises determining the color saturation level S using formula:

$$S=(U^2+V^2)^{1/2}.$$

33. The method according to claim 26, which comprises determining the color saturation level S using formula:

$$S=\alpha(U^2+V^2).$$

34. The method according to claim 26, which comprises determining the color saturation level S using formula:

$$S=\alpha(|U|+|V|).$$

35. The method according to claim 26, which comprises determining the color saturation level S using formula:

$$S=\alpha[\max(U^2,V^2)].$$

36. The method according to claim 26, which comprises determining the color saturation level S using formula:

$$S=\alpha[\max(|U|,|V|)].$$

37. The method according to claim 26, which comprises determining the color saturation level S using formula:

$$S=\alpha(U^2+V^2(U-V)^2).$$

38. A method for adjusting and limiting a color saturation level S of a color pixel of an input image, which comprises:
   obtaining a first chrominance value U and a second chrominance value V representing the color pixel of the input image;
   determining the color saturation level S in dependence on the first chrominance value U and the second chrominance value V;
   determining a parameter in dependence on the color saturation level S;
   obtaining a saturation adjusting gain α;
   obtaining and adjusted first chrominance value by multiplying the first chrominance value U by the parameter and by the saturation adjusting gain α;
   obtaining an adjusted second chrominance value by multiplying the second chrominance value V by the parameter and by the saturation adjusting gain α; and
   representing a color pixel of an output image with the adjusted first chrominance value and the adjusted second chrominance value.

39. The method of claim 26, wherein the step of determining a real color adjusting gain parameter x further includes the steps of determining the real color adjusting gain parameter x as a function of the color saturation level S and a saturation adjusting gain.

* * * * *